(No Model.)
J. MURPHY.
MACHINE FOR CUTTING INDIA-RUBBER.
No. 323,061.                             Patented July 28, 1885.
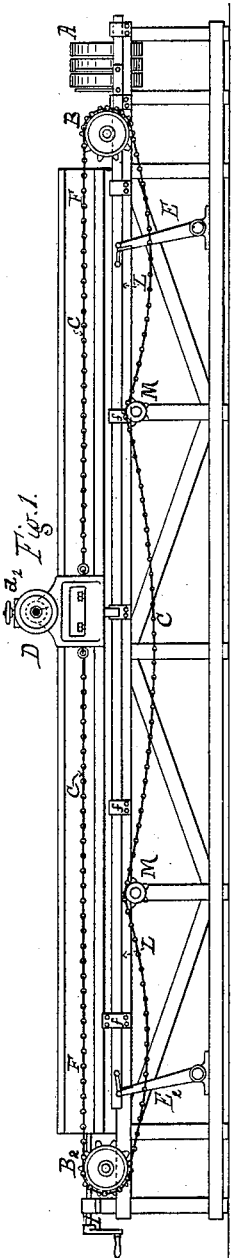
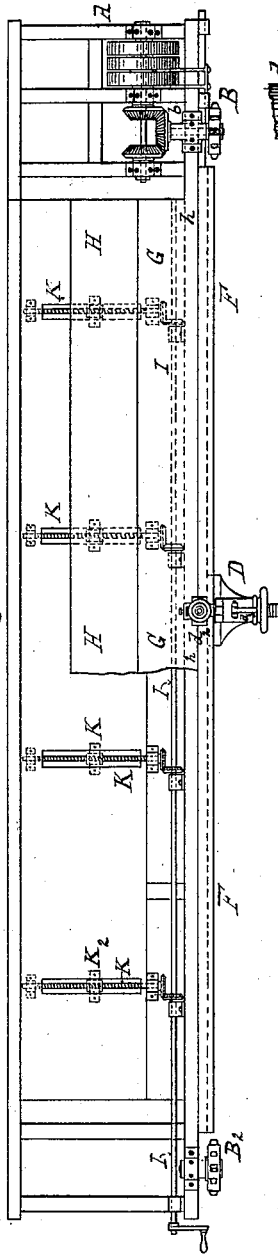
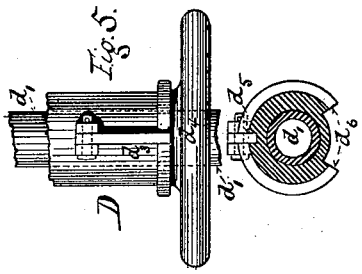
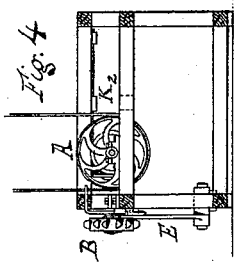
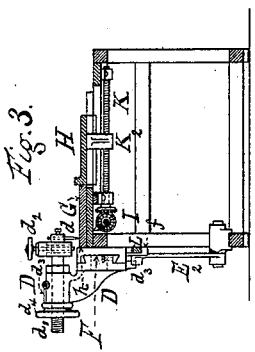
WITNESSES:-
L. P. Smith.
James Mahony
INVENTOR:-
John Murphy
per
Wm H Weightman
Atty

UNITED STATES PATENT OFFICE.

JOHN MURPHY, OF BROOKLYN, NEW YORK.

MACHINE FOR CUTTING INDIA-RUBBER.

SPECIFICATION forming part of Letters Patent No. 323,061, dated July 28, 1885.

Application filed April 8, 1885. (No model.)

*To all whom it may concern:*

Be it known that I, JOHN MURPHY, a citizen of the United States, residing in the city of Brooklyn, county of Kings and State of New York, have invented certain new and useful Improvements in Machinery for Cutting India-Rubber, of which the following is a specification, reference being had to the accompanying drawings.

Certain improvements consist in the combination of a reciprocating tool-carriage operated by a power-transmitting belt, with a table, work-bench, or platform upon which the india-rubber is laid to be cut.

Certain improvements also consist in the combination of a doube-edged cutting-tool, a carriage for controlling thereof, a transmitting-belt, and a table, work-bench, or platform upon which the rubber material is laid.

Other improvements consist in the combination of a groove or guide controlling the movement of the tool-carriage, a power-transmitting belt, and the mechanism, hand or motive power by means of which the machine is operated.

Other improvements consist in the combination of parts, hereinafter specified or described as contained in my improved machine for cutting rubber-cloth into strips of varying widths.

The object of my invention is to facilitate the cutting up of sheet-rubber into strips, and to effect the same in the most economical manner possible. To accomplish this I lay the sheet-rubber or material upon a prepared table or bench, control its position and rigidity by means of the clamping-edges of an adjustable grip or gage, and operate a cutting-tool to and fro the whole length of the sheet to be cut. Such cutting-tool is operated by a reciprocating tool-carriage moving in shears, guides, or grooves confining the whole to a fixed line of cut, such line of cut being adjusted to a width equal to the breadth of strips required.

In the accompanying drawings, Figure 1 represents a front view of a machine embodying my improvements and invention. Fig. 2 represents a plan view of the same. Fig. 3 represents a cross-section, showing method of locating the sheet-rubber to be cut in position for cutting. Fig. 4 represents an end view of a machine embodying method of operating my improved machine by power. Fig. 5 is an enlarged detail of method of adjusting the cutting-tool to a fixed vertical position or to a changeable draw-cut, according to the choice of the operator.

Similar letters of reference indicate like parts in all the figures.

A represents the driving-pulleys and gearing for operating the sprocket-wheel B.

C is the transmitting-belt, attached to both sides of the reciprocating tool-carriage D, and passing to and over the farther sprocket $B^2$.

E and $E^2$ are shifting-levers, the shifting of which reverses the motion of the machine and cutting-tool.

F represents a guide or groove extending the whole length of travel of reciprocating tool-carriage.

G represents the sheet-rubber in place to be cut.

H is the longitudinal adjustable portion of the adjustable grip or gage.

$h$ is a side of the guide or groove F, forming the opposite or fixed portion of the adjustable grip or gage.

I represents a longitudinal shaft for operating the leading-screws K and the nuts $K^2$, to effect the adjustment to position of the part or jaw H to its position to clamp the sheet-rubber in place for cutting.

L is a longitudinal belt-shifting strip, operated by the shifting-levers E and $E^2$, and which is arranged by means of the usual prongs to shift the operating-belting and change the motion of the machine.

M M are idlers to carry loose belting.

In the operation of this device, the sheet-rubber is laid flat, as shown at G, and by revolving the shaft I motion is communicated to the drag-screws K, and through fixed nuts $K^2$ to the adjustable longitudinal grip H, pressing the sheet material to place against the fixed edge $h$, ready for cutting into strips. The cutting-tool $d$ is then adjusted to a cutting touch against the sheet-rubber, and power applied to the sprocket-wheel B, through belt and pulleys, gearing, or other usual and effective means, revolving it in either direction. Through the transmitting belt C, here represented as a sprocket-chain belt, the reciprocating tool-carriage D is operated to and fro, carrying the cutting-tool with it, and effecting the cutting, the cutting-tool $d$ being kept pressed to its work by means of an adjustable cross-head operated by an adjusting-screw and hand-wheel, as represented at $d^2$.

To reverse the motion of the reciprocating tool-carriage, a lug, $d^3$, is attached to the bottom portion of tool-carriage, which as it approaches either of the shifting-levers E E², located at each end of the machine, shifts the levers, moves the shifting-bar F, and through the prongs at the end moves the belt, operating the driving-pulleys A to a reverse motion. This shifting-bar F is held in position along the machine by the guides $f f f$.

The reciprocating tool-carriage is operated within a guide, F, set to the full length of travel of cutting-tool, either on the side or top surface of the cutting table or platform. The general adjustment of the cutting-tool $d$ is effected in a similar manner to those of metal-working machines.

The width of strip to be cut is regulated by an adjusting-screw, $d$, moving the cutting-tool, and operating within a sleeve forming a part of the tool-carriage D, fixing the width of strip to be cut between the cutting-tool and the fixed clamp-edge $h$ of the grip or guide holding the sheet-rubber.

The hand-wheel $d^2$, attached to a screw operating within a slide, to or within which the cutting-tool is attached, is raised or lowered by the use of the hand-wheel $d^2$.

As shown in Figs. 1, 2, and 4, motion is given to the machine through pulleys A, the middle one being loose, the outer pulley communicating with one gear-wheel, and the inner one with a second. These in turn operate the sprocket-wheel, B, through its gear-wheel $b$, in such direction as the belt is shifted to effect. Hand as well as motive power may be used.

To the upper part of the reciprocating tool-carriage A is attached a bolt, $d^3$, to drop or slide into a slot formed upon the hub of the hand-wheel $d^4$. On this hand-wheel $d^4$ are cut two slots, one a narrow one, $d^5$, to suit the exact width of bolt $d^3$, another, $d^6$, cut concentric with the hand-wheel, of such width of reach as to permit of a sufficient change or throw in angular position of cutting-tool at each end of stroke or cut. This vibration or change of angle is effected by the revolving of the adjusting-screw $d$, within the sleeve forming part of the tool-carriage A. As the bolt $d^3$, when dropped into the long slot $d^6$, in position at top of the tool-carriage sleeve, strikes either end of the slot $d^6$ on the hand-wheel $d^4$, the cutting-tool is at once held to a rigid fixed angular position for draw-cut. With the narrow slot in position at top of tool-carriage sleeve, and the bolt $d^3$ in place, the cutting-tool is held to a rigid vertical position to cut in either direction, according to the operation of the machine.

What I claim as new, and desire to secure by Letters Patent, is—

1. In a machine for cutting rubber, the combination of a reciprocating tool-carriage operated by a transmitting-belt, and a table, work-bench, or platform, substantially as and for the purposes specified.

2. In a machine for cutting rubber, the combination of a double-edged cutting-tool, a carriage for controlling the movement thereof, a transmitting-belt, and a table, work-bench, or platform, substantially as and for the purposes specified.

3. In a machine for cutting rubber, the combination of a double-edged cutting-tool, a reciprocating tool-carriage for controlling the movement and depth of cut thereof, a groove or guide controlling the movement of the reciprocating tool-carriage, a transmitting-belt, and a table, work-bench, or platform, substantially as and for the purposes specified.

4. In a machine for cutting rubber, the combination of a double-edged cutting-tool, a reciprocating tool-carriage for controlling the movement and depth of cut thereof, as well as the angular adjustment of cutting-tool, a groove or guide controlling the movement of the reciprocating tool-carriage, a transmitting-belt, and a table, work-bench, or platform, substantially as and for the purposes specified.

5. In a machine for cutting rubber, the combination of a reciprocating tool-carriage, a groove or guide controlling the movement thereof, a transmitting-belt and its operating mechanism, and a table or platform, substantially as and for the purposes specified.

6. In a machine for cutting rubber, the combination of a reciprocating tool-carriage, operated by a transmitting-belt, a table, work-bench, or platform, and an adjustable grip or gage, substantially as and for the purposes specified.

7. In a machine for cutting rubber, the combination of a reciprocating tool-carriage, a double-edged cutting-tool, a transmitting-belt, a guide or groove controlling the movement of the reciprocating tool-carriage, an adjustable grip or gage, and a table, work-bench, or platform, substantially as and for the purposes specified.

8. In a machine for cutting rubber, in combination with an operating table, bench, or platform, an adjustable grip or gage, a guide or groove controlling the movement of the reciprocating tool-carriage, a double-edged cutting-tool, a transmitting-belt, and the operating wheels or pulleys through which power is applied, substantially as and for the purposes specified.

9. In a machine for cutting rubber, the combination, with an operating table, work-bench, or platform, an adjustable grip or guide, a reciprocating tool-carriage, a double-edge cutting-tool capable of angular adjustment to perform a draw-cut, and a transmitting-belt and pulleys, substantially as and for purposes specified.

10. In a machine for cutting rubber, the combination of an operating table, bench, or platform, having an adjustable grip or gage to full length of operating table or platform, a guide or groove, F, controlling the movement of reciprocating tool-carriage, a reciprocating tool-carriage, D, double-edged cutting-tool $d$, a transmitting-belt, C, sprocket-wheels B and $B^2$, and an operating crank, wheel, or pulleys, through which power may be applied, substantially as and for the purposes specified.

11. In a machine for cutting rubber, the combination of the tool-carriage A, the adjusting-screw $d'$, the hand-wheel $d^4$, having slots $d^5$ and $d^6$ upon hub, by means of which the cutting-tool is adjusted to a vertical or a draw-cut, the double-edged knife $d$, adjusting-screws and hand-wheel $d^2$, and the bolt $d^3$, substantially as and for the purposes specified.

JOHN MURPHY.

Witnesses:
W. J. MORGAN,
LYNDON P. SMITH.